US012202278B2

(12) United States Patent
Matsumoto

(10) Patent No.: US 12,202,278 B2
(45) Date of Patent: Jan. 21, 2025

(54) PRINTER

(71) Applicant: Hiroyoshi Matsumoto, Kanagawa (JP)

(72) Inventor: Hiroyoshi Matsumoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 144 days.

(21) Appl. No.: 18/119,304

(22) Filed: Mar. 9, 2023

(65) Prior Publication Data

US 2023/0294434 A1 Sep. 21, 2023

(30) Foreign Application Priority Data

Mar. 19, 2022 (JP) ................................ 2022-044759
Dec. 1, 2022 (JP) ................................ 2022-192538

(51) Int. Cl.
*B41J 25/304* (2006.01)
*B41J 3/407* (2006.01)

(52) U.S. Cl.
CPC ........... *B41J 25/304* (2013.01); *B41J 3/4078* (2013.01)

(58) Field of Classification Search
CPC .............................. B41J 25/304; B41J 3/4078
See application file for complete search history.

(56) References Cited

U.S. PATENT DOCUMENTS

| | | | |
|---|---|---|---|
| 2016/0159108 A1 | 6/2016 | Matsumoto et al. | |
| 2017/0001453 A1 | 1/2017 | Ohshima et al. | |
| 2017/0182799 A1 | 6/2017 | Nakai et al. | |
| 2017/0320349 A1 | 11/2017 | Matsumoto et al. | |
| 2018/0105979 A1 | 4/2018 | Matsumoto | |
| 2018/0126751 A1 | 5/2018 | Nakai et al. | |
| 2019/0289161 A1 | 9/2019 | Yoshigai | |
| 2021/0229472 A1* | 7/2021 | Morino .................... | B41J 11/06 |

FOREIGN PATENT DOCUMENTS

| | | |
|---|---|---|
| JP | 2019-155765 | 9/2019 |
| JP | 2021-115847 | 8/2021 |

* cited by examiner

*Primary Examiner* — Justin Seo
(74) *Attorney, Agent, or Firm* — XSENSUS LLP

(57) ABSTRACT

A printer includes: a liquid discharger configured to discharge a liquid onto a print target; a carriage configured to move the liquid discharger in a main scanning direction; a holder configured to hold the print target and relatively move the print target in a sub-scanning direction orthogonal to the main scanning direction to cause the print target to face the liquid discharger; and multiple height detectors at different positions in the sub-scanning direction, the multiple height detectors configured to detect the print target on the holder.

8 Claims, 12 Drawing Sheets

COMPARATIVE EXAMPLE

COMPARATIVE EXAMPLE

COMPARATIVE EXAMPLE

COMPARATIVE EXAMPLE

PRINTER

CROSS-REFERENCE TO RELATED APPLICATIONS

This patent application is based on and claims priority pursuant to 35 U.S.C. § 119(a) to Japanese Patent Application No. 2022-044759, filed on Mar. 19, 2022, and Japanese Patent Application No. 2022-192538, filed on Dec. 1, 2022, in the Japan Patent Office, the entire disclosure of which is hereby incorporated by reference herein.

BACKGROUND

Technical Field

The present embodiment relates to a printer.

Related Art

There is a textile printing machine that prints on a fabric, such as a T-shirt as a printer.

Such a printer includes a liquid discharger that discharges liquid to a print target, a holder that holds the print target, and a height detector that detects the print target on the holder, in which the height detector detects, at a first height and a second height lower than the first height, the print target.

SUMMARY

A printer includes: a liquid discharger configured to discharge a liquid onto a print target; a carriage configured to move the liquid discharger in a main scanning direction; a holder configured to hold the print target and relatively move the print target in a sub-scanning direction orthogonal to the main scanning direction to cause the print target to face the liquid discharger; and multiple height detectors at different positions in the sub-scanning direction, the multiple height detectors configured to detect the print target on the holder.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
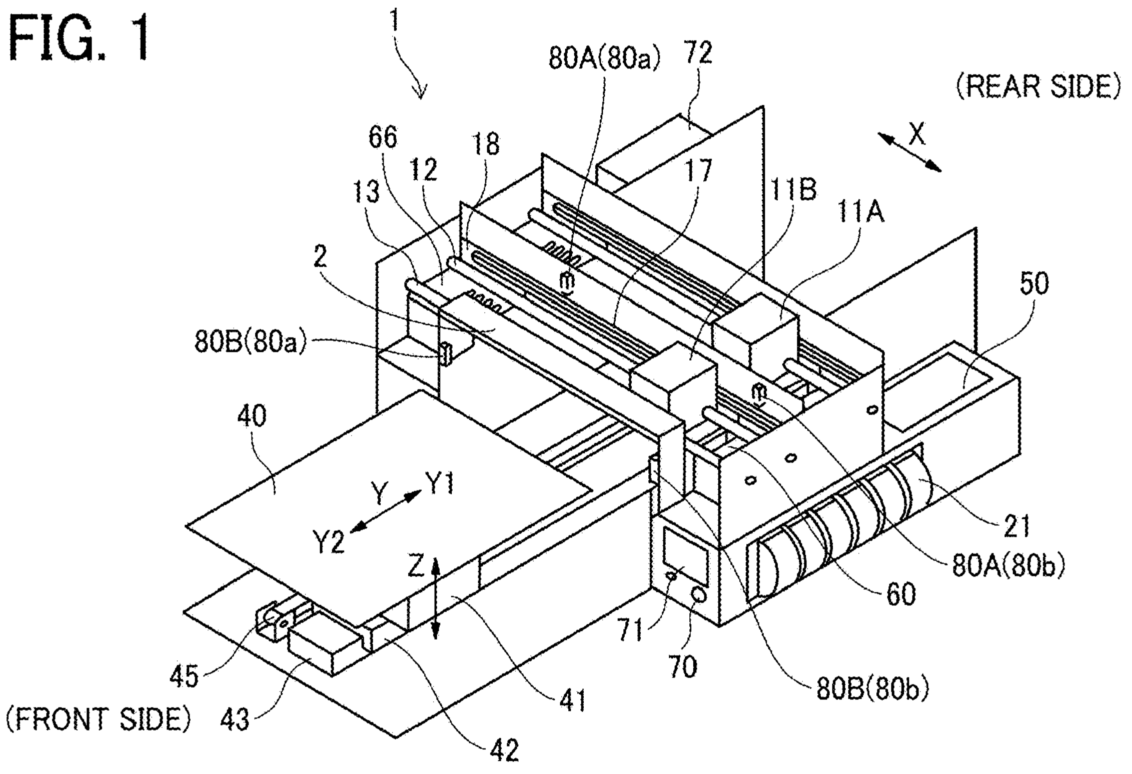
FIG. 1 an explanatory perspective view of a printer according to a first embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
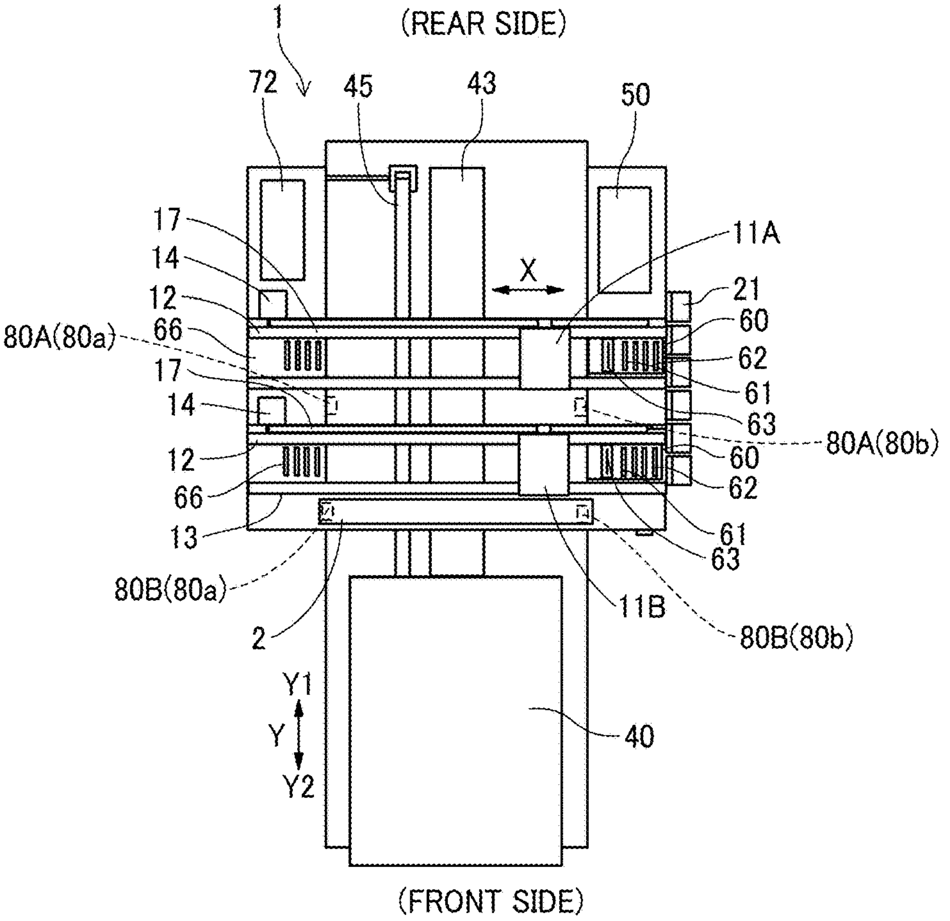
FIG. 2 is an explanatory plan view of the printer.
Figure 3:
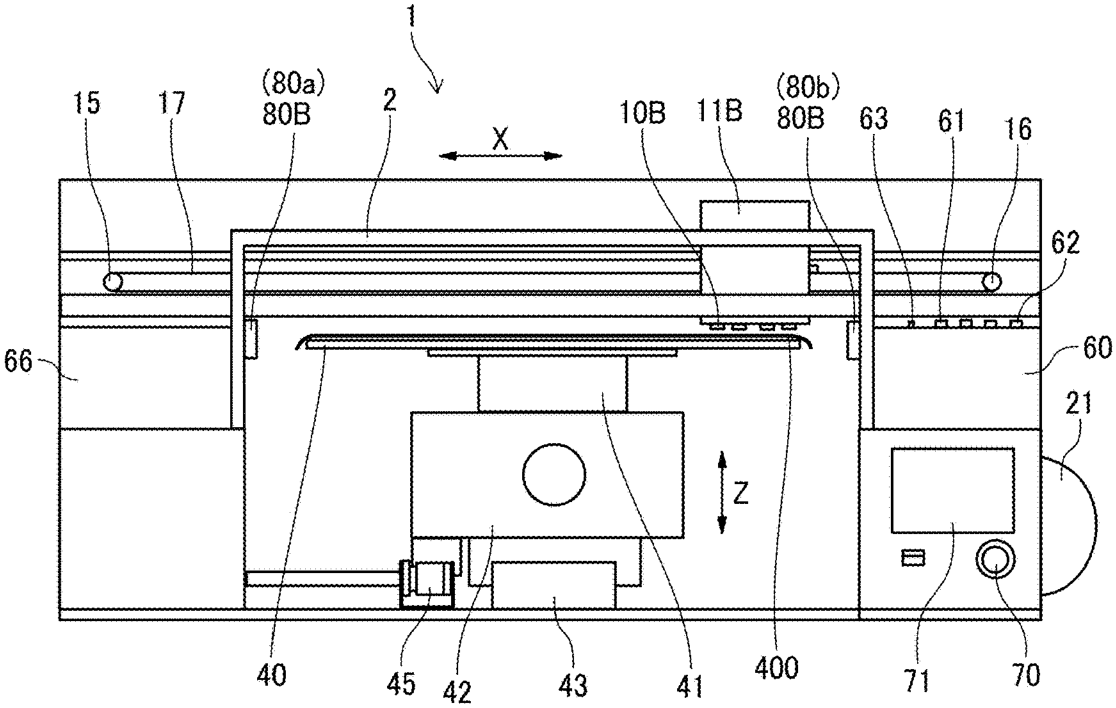
FIG. 3 is an explanatory front view of the printer.

Embodiments of the present embodiment will be described below with reference to the accompanying drawings. A printer according to a first embodiment of the present embodiment will be described with reference to FIGS. 1 to 3. FIG. 1 is an explanatory perspective view of the printer. FIG. 2 is an explanatory plan view of the printer. FIG. 3 is an explanatory front view of the printer.

A printer 1 includes a liquid discharger that discharges liquid, a carriage 11A movable in a main scanning direction X, and a carriage 11B movable in the main scanning direction X. The carriage 11A and the carriage 11B are spaced apart in a sub-scanning direction Y orthogonal to the main scanning direction X.

The carriage 11A mounts a first head 10A including at least one head. The at least one head of the first head 10A mounted on the carriage 11A includes two nozzle arrays that are each an array of nozzles that each discharge liquid, and discharges liquid in white W. Note that the first head 10A is not limited to such liquid in white W and thus can discharge liquid in other colors or treatment liquid.

The carriage 11B mounts a second head 10B including, for example, four heads. Each head of the second head 10B includes two nozzle arrays that are each an array of nozzles that each discharge liquid. Each head of the second head 10B of the carriage 11B discharges liquid in yellow Y, magenta M, cyan C, or black K.

The rear and front carriages in the printer according to the present embodiment are the carriage 11A and the carriage 11B, respectively. Thus, multiple liquid dischargers, namely, the first head 10A and the second head 10B are disposed at different positions in the sub-scanning direction Y.

The carriage 11A further mounts a sub-tank that temporarily stores liquid to be supplied to the first head 10A. The carriage 11B further mounts a sub-tank that temporarily stores liquid to be supplied to the second head 10B. Liquid in desired color is fed by a feeding pump from a main tank 21 to the corresponding sub-tank through a supply tube.

The carriages 11A and 11B are each held by guide members 12 and 13 and are reciprocally movable in the main scanning direction X. The carriages 11A and 11B are each coupled to a timing belt 17 stretched around a drive pully 15 and a driven pully 16 to be rotated by a main scanning motor 14. The carriages 11A and 11B each reciprocally move in the main scanning direction X due to drive of the main scanning motor 14.

The printer 1 includes an encoder sheet 18 disposed along the main scanning direction X. The encoder sheet 18 includes slits periodically firmed in the encoder sheet 18. The carriages 11A and 11B each include a read sensor that reads the slits of the encoder sheet 18. The position of each of the carriages 11A and 11B in the main scanning direction X can be detected based on a result of reading from the corresponding read sensor.

A controller board 50 controls each of the first head 10A and the second head 10B to discharge ink as liquid at the timing at which the carriage position acquired from a result of reading from the read sensor of the corresponding carriage 11 and the discharge position match together.

The printer 1 includes a platen 40 as a holder that holds a fabric 400 as a print target. The platen 40 is mounted on an elevator 41 and is movable in a height direction (up-down direction) Z relative to the first head 10A of the carriage 11A and the second head 10B of the carriage 11B. That is, the platen 40 is adjustable in height. The printer 1 includes a slider 42 on which the elevator 41 of the platen 40 is mounted. The printer 1 includes a slider rail 43 on which the slider 42 is movably mounted. The slider rail 43 is extended along a sub-scanning direction indicated by arrow "Y." The sub-scanning direction Y is orthogonal to the main scanning direction X. Thus, the slider 42 moves along the slider rail 43 in the sub-scanning direction Y.

The slider 42 is reciprocally movable in the sub-scanning direction Y via a timing belt 45 by a sub scan drive mechanism. Reciprocal movement of the slider 42 in the sub-scanning direction Y reciprocally moves the platen 40 in the sub-scanning direction Y. Note that the sub-scanning direction Y has a direction Y1 from the front side to rear side of the printer 1 and a direction Y2 from the rear side to front side of the printer 1.

On one side in the main scanning direction X of the printer 1, disposed is a maintenance unit 60 that maintains each of the first head 10A of the carriage 11A and the second head 10B of the carriage 11B. The maintenance unit 60 includes a suction cap 61 that caps the respective nozzle faces of the first head 10A and the second head 10B, a moisture-retention cap 62 that caps the nozzle faces of the first head 10A and the second head 10B for moisture retention, and a wiper 63 that wipes the nozzle faces of the first head 10A and the second head 10B. The suction cap 61 is coupled to a suction pump.

The printer 1 includes a discharge receptacle 66 on another end of the printer 1 in the main scanning direction X. During printing, the controller board 50 causes the first head 10A and the second head 10B to discharge liquid to the discharge receptacle 66, so that the first head 10A and the second head 10B are maintained.

Further, the printer 1 includes a power button 70, an operation panel 71, a power supply unit 72, and the like.

Figure 4:
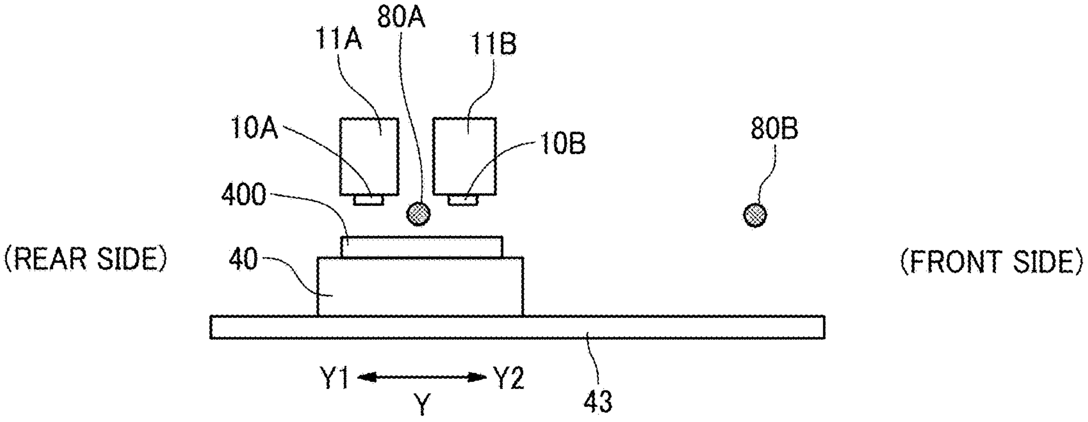
FIG. 4 is an explanatory schematic side view for describing a height detector in the first embodiment.
Figure 5A:
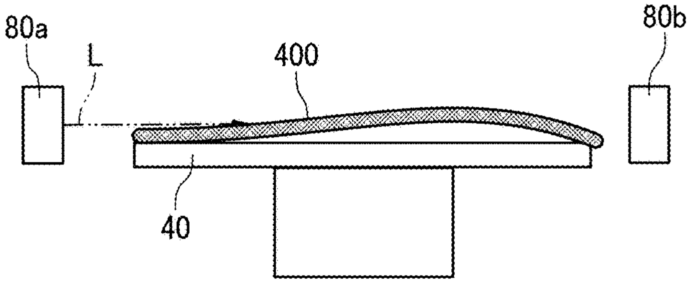
FIGS. 5A and 5B are explanatory front views for the function of the height detector.
Figure 5B:
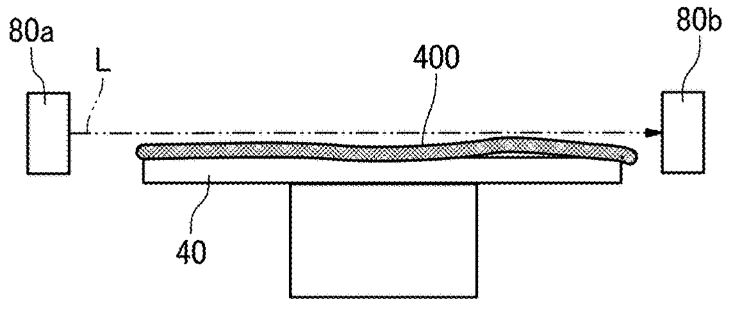

Next, a height detector in the printer will be described with reference to FIGS. 4, 5A, and 5B. FIG. 4 is an explanatory schematic side view of the printer. FIGS. 5A and 5B are explanatory front views for describing the function of the height detector.

The printer 1 includes, as multiple height detectors 80, a first height detector 80A and a second height detector 80B disposed at different positions in the sub-scanning direction Y. The first height detector 80A and the second height detector 80B detect the platen 40 or the fabric 400 on the platen 40.

The first height detector 80A and the second height detector 80B each include a light emitter 80*a* and a photoreceiver 80*b* disposed, respectively, on one side and the other side in the main scanning direction X. The heights that the first height detector 80A and the second height detector 80B detect are identical.

As illustrated in FIG. 5B, the first height detector 80A and the second height detector 80B can each detect that the fabric 400 is not more than a predetermined height, based on the photoreceiver 80*b* having received laser light L from the light emitter 80*a*. Contrary, as illustrated in FIG. 5A, the first height detector 80A and the second height detector 80B can each detect that the fabric 400 is higher than the predetermined height, based on the photoreceiver 80*b* having not received the laser light L from the light emitter 80*a*.

The first height detector 80A is disposed between the carriage 11A mounting the first head 10A and the carriage 11B mounting the second head 10B in the sub-scanning direction Y. In other words, the first height detector 80A is disposed downstream of the carriage 11B mounting the second head 10B and upstream of the carriage 11A mounting the first head 10A in the direction Y1 of the sub-scanning direction Y.

The second height detector 80B is disposed at an inlet of the printer 1 in the sub-scanning direction Y. In other words, the second height detector 80B is disposed upstream of the carriage 11A mounting the first head 10A and the carriage 11B mounting the second head 10B in the direction Y1 of the sub-scanning direction Y.

Note that three height detectors or more can be disposed in the sub-scanning direction Y. In such a case, from among three height detectors or more, two height detectors or more can be disposed between the carriage 11A mounting the first head 10A and the carriage 11B mounting the second head 10B in the sub-scanning direction Y. As such height detectors, range sensors can be used.

Figure 6:
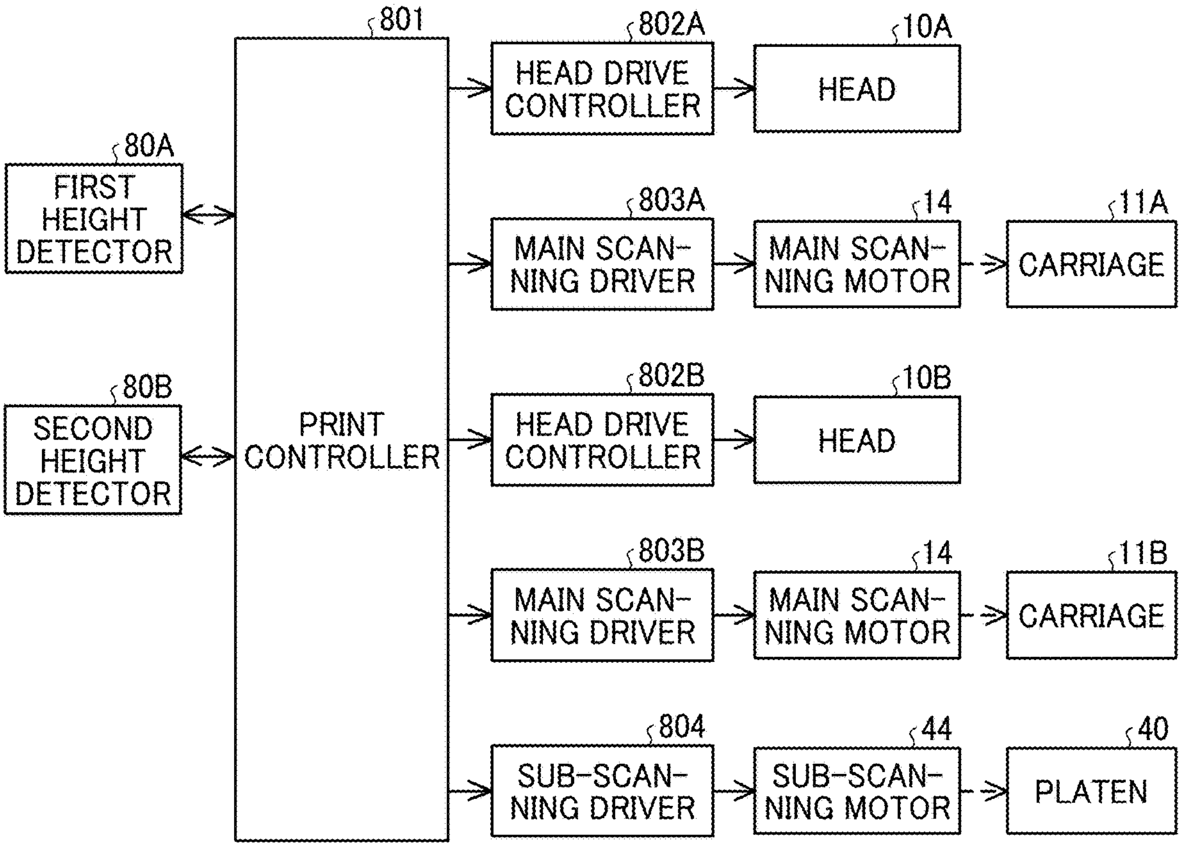
FIG. 6 is an explanatory block diagram for describing parts according to control of print operation in the first embodiment.

Next, parts according to control of the print operation of the printer will be described with reference to the explanatory block diagram of FIG. 6.

A print controller 801 controls the driving of the head 10A on the carriage 11A via a head drive controller 802A. The print controller 801 drives the main scanning motor 14 via a main scanning driver 803A to reciprocally move the carriage 11A in the main scanning direction X.

The print controller 801 controls the driving of the head 10B on the carriage 11B via a head drive controller 802B.

The print controller 801 drives the main scanning motor 14 via a main scanning driver 803B to reciprocally move the carriage 11B in the main scanning direction X.

The print controller 801 drives a sub-scanning motor 44 via a sub-scanning driver 804 to reciprocally move the platen 40 in the sub-scanning direction Y.

The print controller 801 receives respective results of detection of the first height detector 80A and the second height detector 80B and determines whether or not the fabric 400 on the platen 40 has been detected as being not more than the predetermined height.

Next, a flow of print operation of the primer 1 will be described.

In some cases, preferably, the face to be subjected to printing of the fabric 400 as the print target is coated with pretreatment liquid before printing. Such pretreatment causes liquid (ink) to barely enter the grain of the fabric 400, effecting an improvement in image quality.

A method for coating pretreatment liquid may be achieved with a roller or a spray, provided that the face to be subjected to printing can be coated uniformly with the pretreatment liquid. Directly after coating, the fabric 400 may be set to the printer 1 for printing. If possible, preferably, the pretreatment liquid is dried by heat and pressure with a heat press in order to suppress any wrinkles or nap of the fabric 400.

The fabric 400 subjected to such a flow of work before printing is set to the platen 40 without any wrinkles.

Then, an information processing apparatus, such as a personal computer (PC) or a smartphone, gives a print command to the printer 1, so that the printer 1 performs operation checking.

After that, the printer 1 moves the platen 40 on which the fabric 400 is mounted in the direction Y1 of the sub-scanning direction Y, leading to movement of the platen 40 to the print start position on the rear side.

In this case, the first height detector 80A and the second height detector 80B each detect the height of the fabric 400 on the platen 40 in order not to allow the surface of the fabric 400 to be in contact with the nozzle face on the surface of the corresponding head 10. The distance (gap) between the surface of the fabric 400 and the nozzle face of each of the first head 10A and the second head 10B is preferably as small as possible and is set not to cause contact. Specifically, the distance is 0.5 to 7 mm.

In a case where the height of the surface of the fabric 400 is in excess of the predetermined height, an operation is made to lower the platen 40.

Then, after the platen 40 passes the second height detector 80B and the first height detector 80A with no error, the platen 40 moves to the print start position.

After that, movement of the carriage 11A and liquid discharge from the first head 10A result in a line of printing in white W on the fabric 400. After the line of printing, the platen 40 moves by a line. Repetition of one scan of the carriage 11A and an intermittent movement of the platen 40 results in printing in white W on a desired region of the fabric 400.

After that, the platen 40 returns to the print start position. Then, movement of the carriage 11B and liquid discharge from the second head 10B result in printing of a line of image in YMCK on the region printed in white W of the fabric 400. After the line of image, the platen 40 moves by a line. Repetition of one scan of the carriage 11B and an intermittent movement of the platen 40 results in printing of a desired image on a desired region of the fabric 400.

Note that, for no printing in white W, image printing is performed with the second head 10B without printing with the first head 10A.

Then, after completion of the printing, the platen 40 returns to the front of the printer 1, resulting in print termination. After print termination, the fabric 400 is taken out from the platen 40. The fabric 400 is subjected to posttreatment by heat and fixing with a heat press or an oven fixing apparatus, leading to termination of the work.

In the present embodiment, provided are the carriage 11A for white W and the carriage 11B for YMCK.

Titanium oxide is used as colorant in ink in white W. It is known that, differently from other pigments, titanium oxide is higher in specific gravity and settles down due to a long term of storage. Ink of which the pigment has settled down is thin in color and remains in the ink channel or causes blocking of the nozzles in the head. For prevention of settlement of pigment, preferably, a maintenance process is carried out, such as regular automatic discharge or in-channel circulation. In this case, provision of a carriage for white W enables an independent maintenance process for white W.

In printing without ink in white W, a single carriage including inks in all the colors causes exposure of the nozzle face for ink in white W to air at all times. Thus, the ink is likely to fasten at the nozzle face, leading to head replacement.

Therefore, due to the independence of the carriage 11A for ink in white W, the carriage 11A for ink in white W is not needed to operate in printing without ink in white W. Thus, the carriage 11A capped with the suction cap 61 can be stored without exposure to the open air. This leads to stability or a long life.

The main purpose of use of ink in white W is printing as undercoating to a colored fabric. That is, the print pattern is a solid image that is low in resolution. Thus, the independence of the carriage 11A for ink in white W is useful for a higher rate of printing.

The provision of the two carriages 11A and 11B enables separate operations of the carriages 11A and 11B. In the present embodiment, for example, in printing of an image in YMCK with the carriage 11B in operation after printing with ink in white W with the carriage 11A in operation, the first head 10A of the carriage 11A having finished the printing can be maintained.

As above, almost simultaneous separate operations of the two carriages enable a reduction in fruitless time.

One of two carriages 11A and 11B may mount a sub tank containing a color ink, and the color ink may include a white ink. Another of two carriages 11A and 11B may mount a sub tank containing a pretreatment liquid.

The printer 1 includes the carriage 11 for the pretreatment liquid separately from the carriage 11 for the ink such as the color ink. Thus, the printer 1 can apply the pretreatment liquid and the ink at the same time by inkjet method by one printer.

The printer 1 applies both of the pretreatment liquid and the ink by inkjet method so that the printer 1 can apply the pretreatment liquid and the ink only to a desired place. Thus, the printer 1 can reduce an amount and a cost for the pretreatment liquid and the ink.

Since the printer 1 can apply the pretreatment liquid and the ink by one body of the printer 1, it is needless to use separate apparatuses to apply the pretreatment liquid and the ink.

Next, the effect of the multiple height detectors 80 disposed in the sub-scanning direction is described below.

As described above, in a case where the platen 40 moves from the front side of the printer 1 to the print start position on the rear side after the fabric 400 is set to the platen 40, use of the multiple height detectors 80 can improve the accuracy of detection of any nap or wrinkles of the fabric 400.

That is, after the platen 40 passes the second height detector 80B, in some cases, nap or wrinkles occur on the surface of the fabric 400, resulting in a change in the height of the surface of the fabric 400. In this case, detection of the height of the fabric 400 by the first height detector 80A enables prevention of contact between the fabric 400 and the nozzle face of the first head 10A of the carriage 11A.

Detection of the same height by the first height detector 80A and the second height detector 80B enables checking of the precision of the surface of the platen 40. For example, operating the platen 40 in the sub-scanning direction Y in non-printing and detecting the height of the surface of the platen 40 with the first height detector 80A and the second height detector 80B enable detection of the surface of the platen 40 for unevenness or angle (inclination).

Next, a second embodiment of the present embodiment will be described with reference to FIGS. 7A to 7D. FIGS. 7A to 7D are explanatory views for describing an operation for printing a nozzle check pattern for verifying the state of the nozzles of a head in the second embodiment.

Note that, unless otherwise specified, the configuration of a printer 1 in each of the following embodiments including the second embodiment is identical to the configuration of the printer 1 in the first embodiment, and thus the descriptions thereof will be omitted.

An apparatus including a liquid discharger prints a pattern for verifying the state of discharge of the nozzles of the liquid discharger (called "nozzle check pattern"). Based on a result of printing, the state of discharge of the nozzles is verified.

Figure 7A:
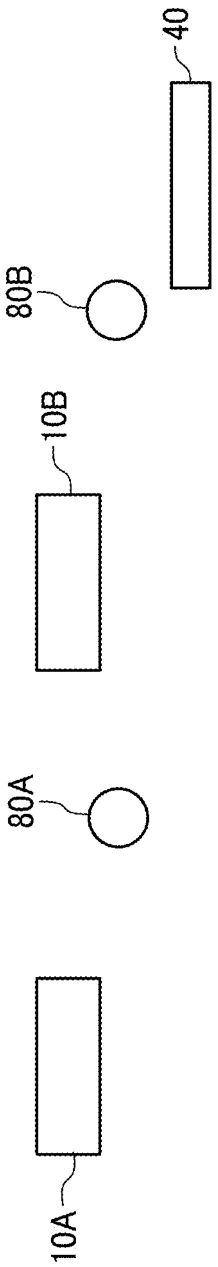
FIGS. 7A to 7D are explanatory views for describing the operation of printing a nozzle check pattern in a second embodiment of the present embodiment.

In the present embodiment, as illustrated in FIG. 7A, a second height detector 80B detects the height of a print target for pattern printing on a platen 40, followed by adjustment of the height of the print target for pattern printing to a predetermined height.

Figure 7B:
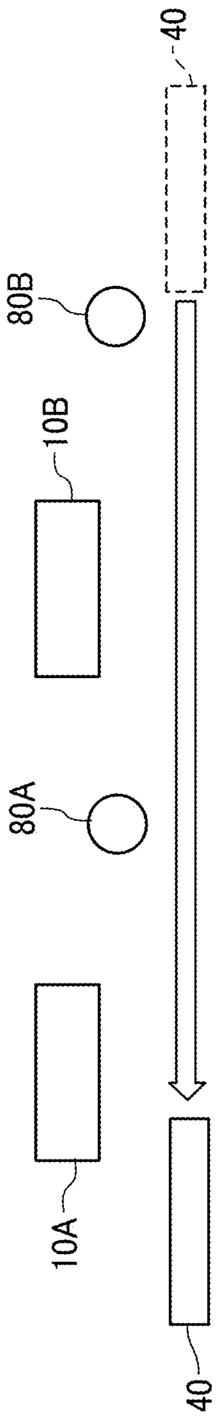

After that, as illustrated in FIG. 7B, the platen 40 moves in the direction Y1 of the sub-scanning direction Y. Then, a first head 10A prints a nozzle check pattern on the print target.

Figure 7C:
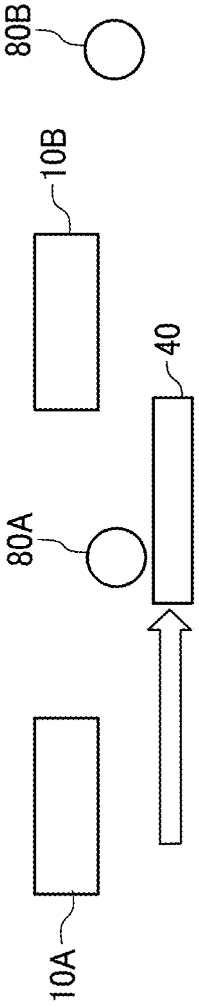

Next, as illustrated in FIG. 7C, the platen 40 moves in the direction Y2 of the sub-scanning direction Y. Then, a first height detector 80A detects the height of the print target for pattern printing on the platen 40, followed by adjustment of the height of the print target for pattern printing to the predetermined height.

Figure 7D:
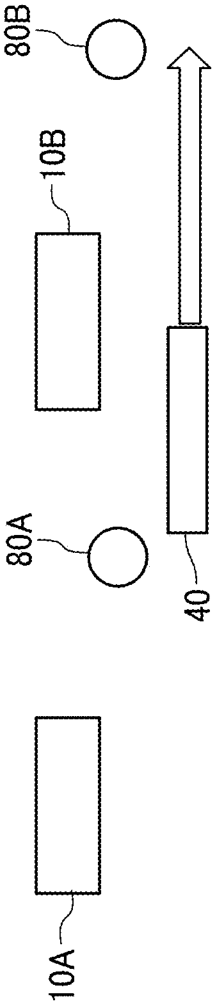

After that, as illustrated in FIG. 7D, the platen 40 moves in the direction Y2 of the sub-scanning direction Y. Then, a second head 10B prints a nozzle check pattern on the print target.

As above, with adjustments of the height of the print target on both the first path (direction Y1) and the second path (direction Y2), pattern printing can be performed. Thus, nozzle check patterns can be printed in a short time.

Printing of a nozzle check pattern according to a comparative example will be described with reference to FIGS. 8A to 8D. FIGS. 8A to 8D are explanatory views for describing the printing according to the comparative example.

According to the comparative example, provided is a single height detector 80 corresponding to the second height detector 80B in the above embodiment.

Figure 8A:
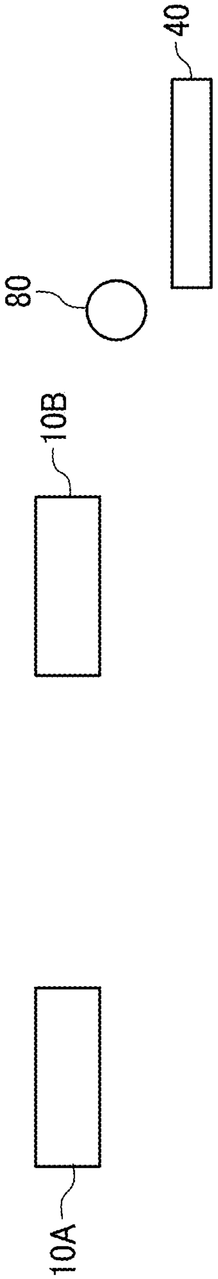
FIGS. 8A to 8D are explanatory views for describing the operation of printing a nozzle check pattern in a comparative example.

Therefore, as illustrated in FIG. 8A, the height detector 80 detects the height of a print target for pattern printing on a platen 40, followed by adjustment of the height of the print target for pattern printing to a predetermined height.

Figure 8B:
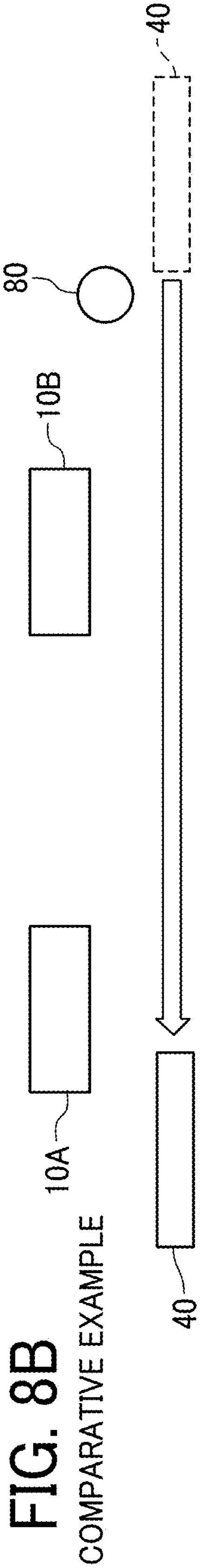

After that, as illustrated in FIG. 8B, the platen 40 moves in the direction Y1 of the sub-scanning direction Y. Then, a first head 10A prints a nozzle check pattern on the print target.

Figure 8C:
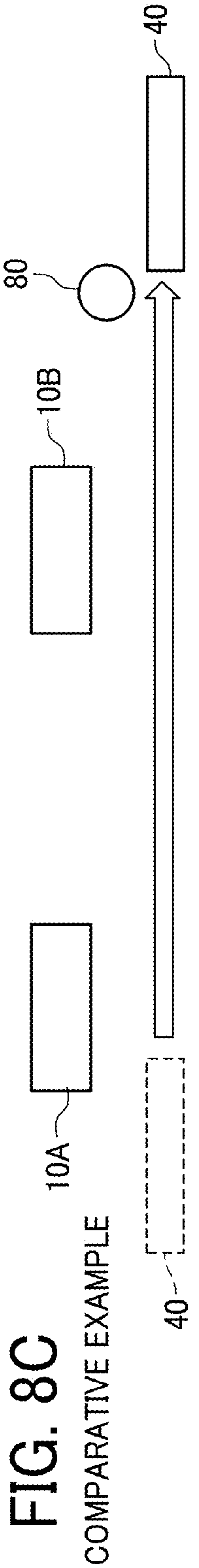

Next, as illustrated in FIG. 8C, the platen 40 moves in the direction Y2 of the sub-scanning direction Y to return to the initial position in FIG. 8A. The height detector 80 detects the height of the print target for pattern printing on the platen 40, followed by adjustment of the height of the print target for pattern printing to the predetermined height.

Figure 8D:
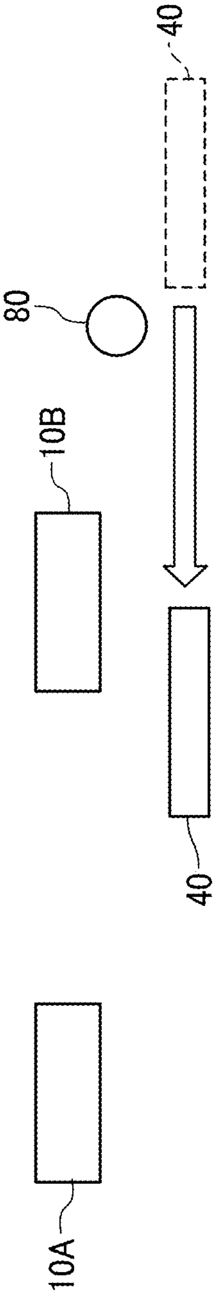

Then, as illustrated in FIG. 8D, the platen 40 moves in the direction Y1 of the sub-scanning direction Y. Then, a second head 10B prints a nozzle check pattern on the print target.

As above, in comparison to an embodiment in which the multiple height detectors 80 are disposed at different positions in the sub-scanning direction, according to the comparative example in which a single height detector is disposed, pattern printing is performed with adjustments of the height of the print target on the first path (direction Y1), leading to time-consuming pattern printing.

That is, with such a configuration in which the multiple liquid dischargers (heads 10) are disposed at different positions in the sub-scanning direction and furthermore height detectors are disposed at different positions in the sub-scanning direction as in the present embodiment, pattern printing with the liquid dischargers different in position enables a shorter time of printing, without positioning based on returning to the height detector at the start of printing.

Figure 9:
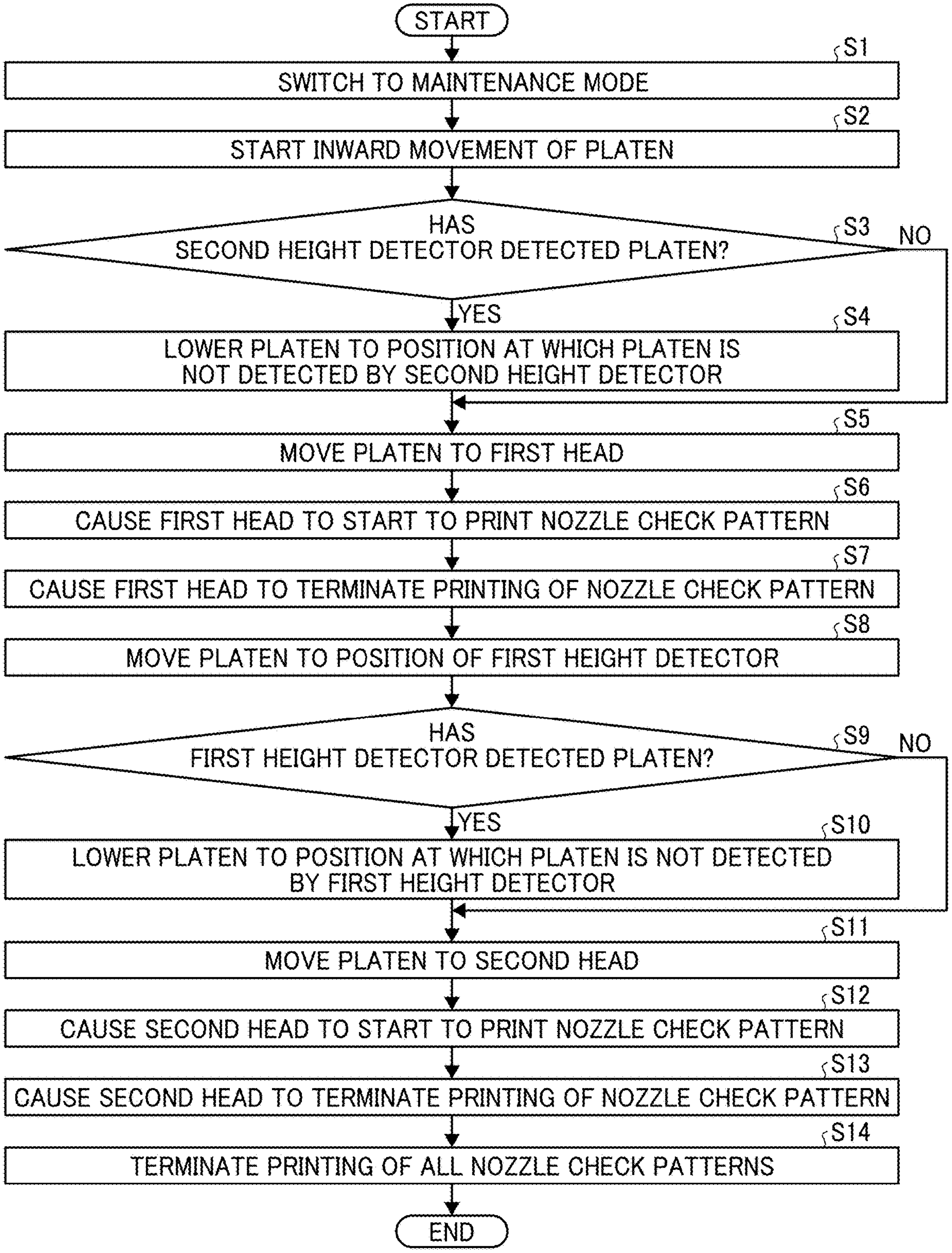
FIG. 9 is a flowchart for describing control according to printing of a nozzle check pattern by a controller in the second embodiment.

Next, control according to printing of a nozzle check pattern by a controller in the present embodiment will be described with reference to the flowchart of FIG. 9. Note that the "controller" herein is part of a print controller and controls printing of a nozzle check pattern.

First, a switch is made to a maintenance mode (step S1 namely, S1).

Then, inward movement of the platen 40 starts (movement in the direction Y1) (S2).

Then, it is determined whether or not the second height detector 80B has detected the print target on the platen 40, namely, the platen 40 (S3).

In a case where the second height detector 80B has detected the platen 40, the platen 40 is lowered to a position at which the print target on the platen 40, namely, the platen 40 is not detected by the second height detector 80B (S4).

After that, the platen 40 moves to the first head 10A (S5). The first head 10A starts to print a nozzle check pattern (S6). The first head 10A terminates the printing of the nozzle check pattern (S7).

Next, the platen 40 moves to the position of the first height detector 80A (S8).

Then, it is determined whether or not the first height detector 80A has detected the platen 40 (S9).

In a case where the first height detector 80A has detected the platen 40, the platen 40 is lowered to a position at which the print target on the platen 40 is not detected by the first height detector 80A (S10).

After that, the platen 40 moves to the second head 10B (S11). The second head 10B starts to print a nozzle check pattern (S12). The second head 10B terminates the printing of the nozzle check pattern (S13).

Then, the printing of all the nozzle check patterns is terminated (S14).

Figure 10A:
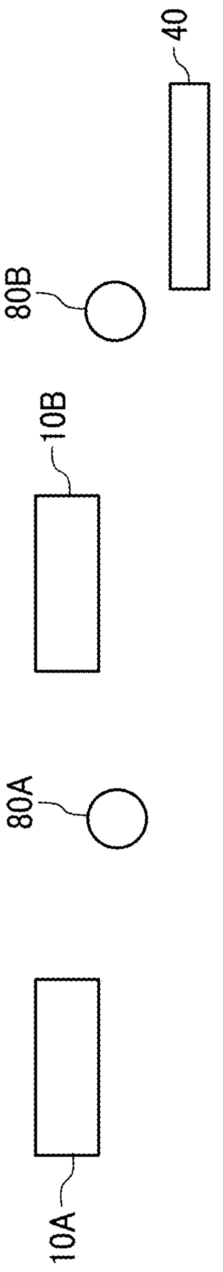
FIGS. 10A to 10C are explanatory views for describing an operation for printing a nozzle check pattern for verifying the state of the nozzles of a head in a third embodiment of the present embodiment.
Figure 10B:
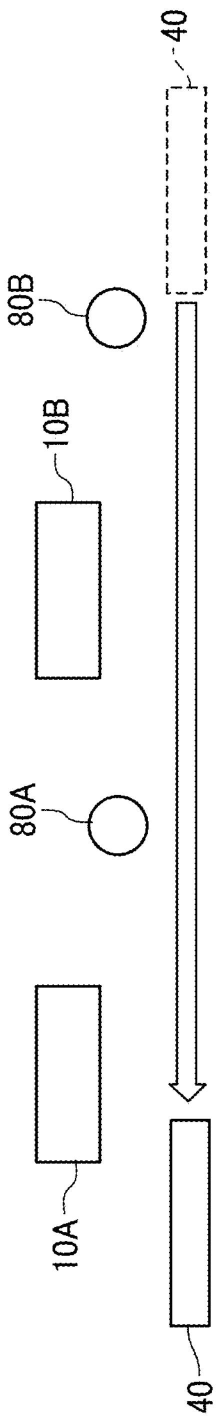
Figure 10C:
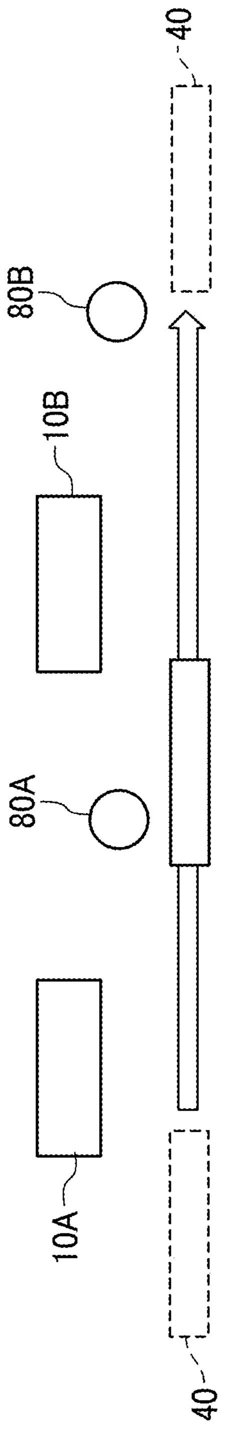

Next, a third embodiment of the present embodiment will be described with reference to FIGS. 10A to 10C. FIGS. 10A to 10C are explanatory views for describing an operation for printing a nozzle check pattern for verifying the state of the nozzles of a head in the third embodiment.

In the present embodiment, as illustrated in FIG. 10A, a second height detector 80B detects the height of a print target for pattern printing on a platen 40, followed by adjustment of the height of the print target for pattern printing to a predetermined height.

After that, as illustrated in FIG. 10B, the platen 40 moves in the direction Y1 of the sub-scanning direction Y. Then, a first head 10A prints a nozzle check pattern on the print target.

Next, as illustrated in FIG. 10C, the platen 40 moves in the direction Y2 of the sub-scanning direction Y to return to the initial position. In this case, a first height detector 80A and the second height detector 80B do not detect the height of the print target for pattern printing on the platen 40.

That is, in the present embodiment, in operation for printing a pattern for verifying the state of discharge of a liquid discharger, in order to move the liquid discharger and a holder relatively to the start position for printing of the pattern in the sub-scanning direction, the holder and the liquid discharger are controlled to move relatively in the height direction, based on a result of detection of a height detector. After the printing of the pattern, the liquid discharger and the holder are controlled to move relatively to the initial position, without a result of detection of the height detector.

Figure 11:
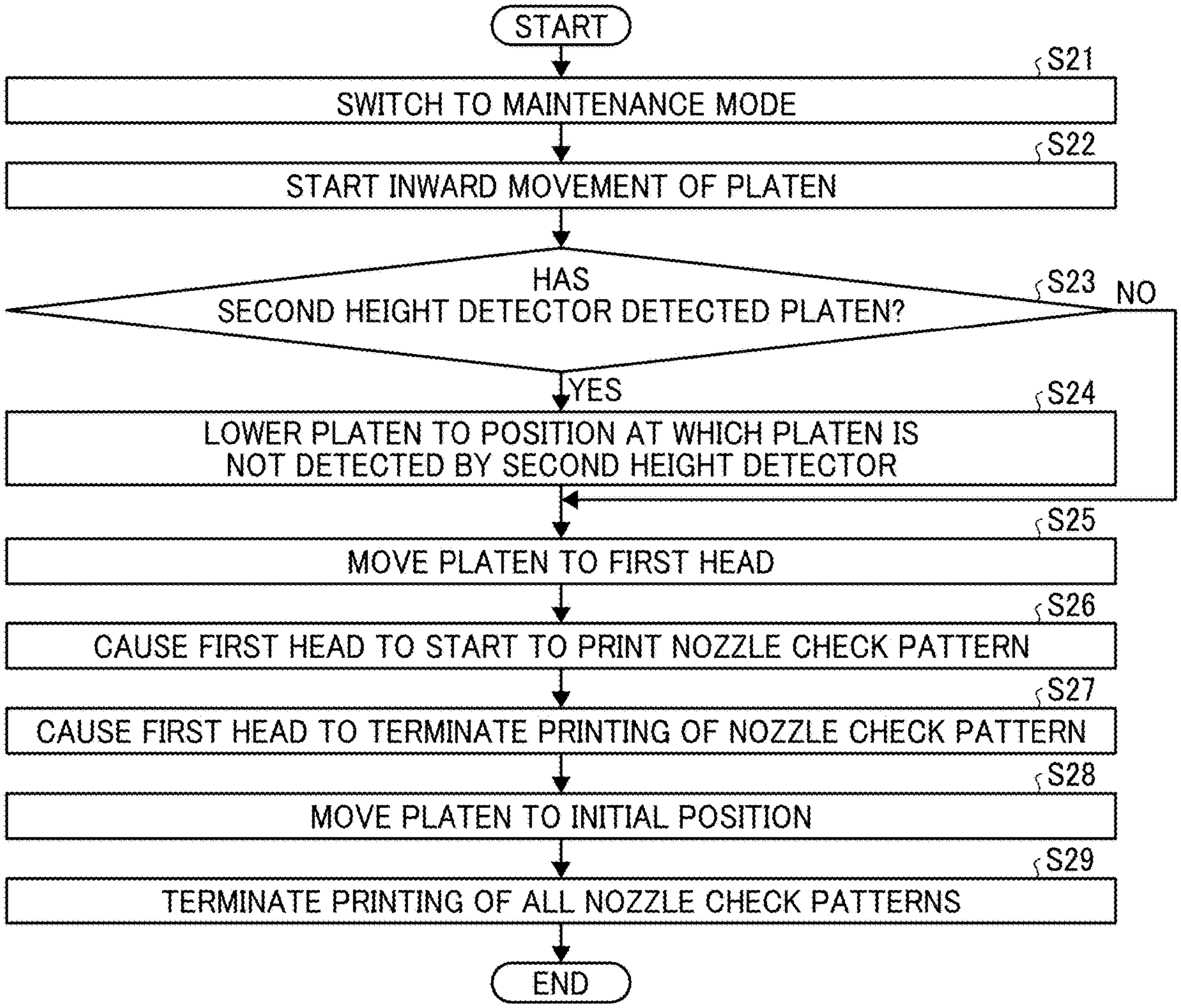
FIG. 11 is a flowchart for describing control according to printing of a nozzle check pattern by a controller in the third embodiment.

Next, control according to printing of a nozzle check pattern by a controller in the present embodiment will be described with reference to the flowchart of FIG. 11.

First, a switch is made to a maintenance mode (S21).

Then, inward movement of the platen 40 starts (movement in the direction Y1) (S22).

Then, it is determined whether or not the second height detector 80B has detected the platen 40 (S23).

In a case where the second height detector 80B has detected the platen 40, the platen 40 is lowered to a position at which the platen 40 is not detected by the second height detector 80B (S24).

After that, the platen 40 moves to the first head 10A (S25). The first head 10A starts to print a nozzle check pattern (S26). The first head 10A terminates the printing of the nozzle check pattern (S27).

Next, the platen 40 moves to the initial position in the direction Y2 (S28). In this case, no detection with the first height detector 80A and the second height detector 80B and no control based on a result of detection are performed.

Then, the printing of all the nozzle check patterns is terminated (S29).

Next, a fourth embodiment of the present embodiment will be described with reference to FIGS. 12A to 12D. FIGS. 12A to 12D are explanatory views for describing an operation for printing a nozzle check pattern for verifying the state of the nozzles of a head in the fourth embodiment.

Figures 12A, 12B, 12C, 12D:
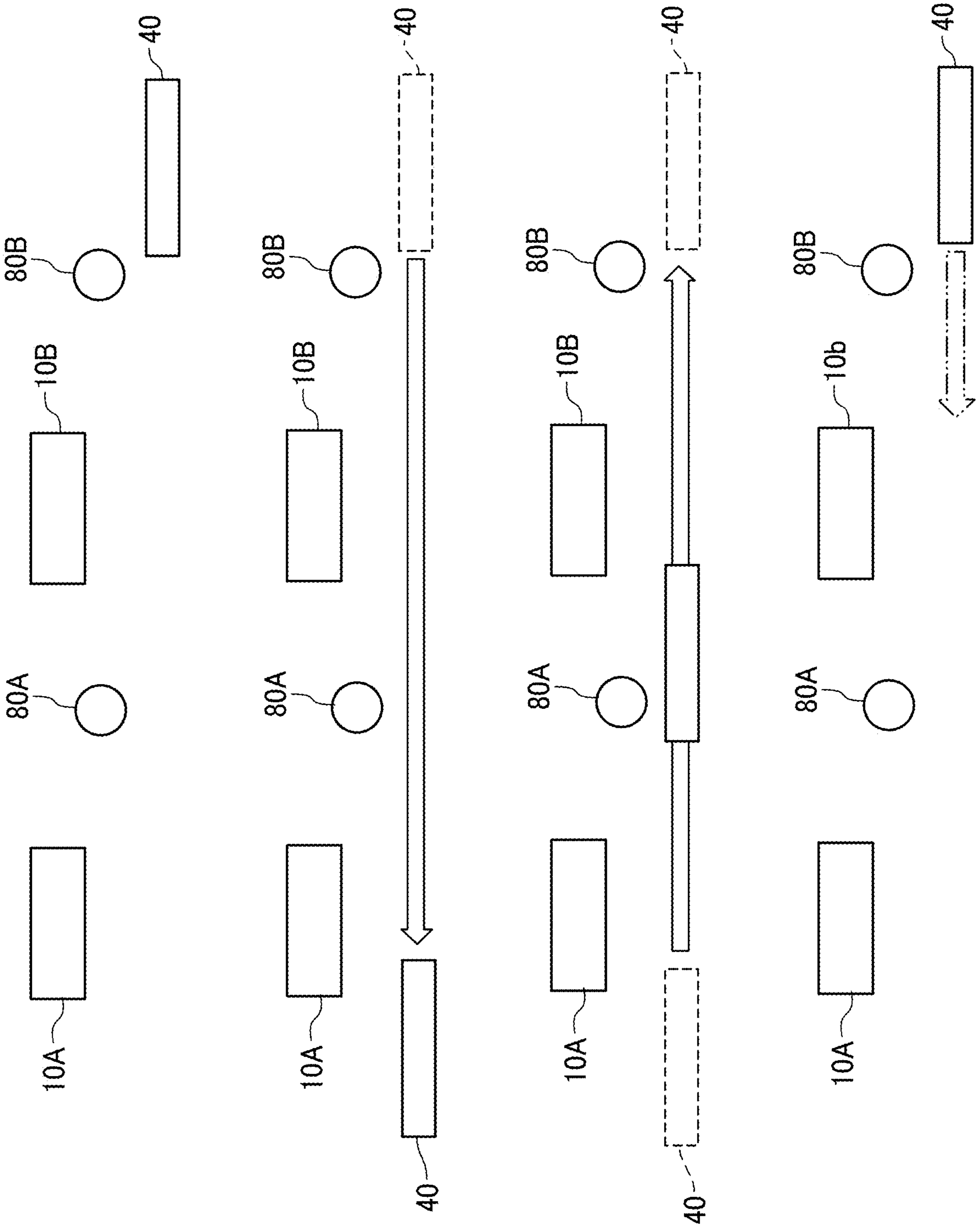
FIGS. 12A to 12D are explanatory views for describing an operation for printing a nozzle check pattern for verifying the state of the nozzles of a head in a fourth embodiment of the present embodiment.

In the present embodiment, as illustrated in FIG. 12A, a second height detector 80B detects the height of a print target for pattern printing on a platen 40, followed by adjustment of the height of the print target for pattern printing to a predetermined height.

After that, as illustrated in FIG. 12B, the platen 40 moves in the direction Y1 of the sub-scanning direction Y. Then, a first head 10A prints a nozzle check pattern on the print target.

Next, as illustrated in FIG. 12C, the platen 40 moves in the direction Y2 of the sub-scanning direction Y. Then, a first height detector 80A or the second height detector 80B detects the height of the print target for pattern printing on the platen 40, followed by storage of a result of detection of whether or not the first height detector 80A or the second height detector 80B has detected the print target for pattern printing.

After that, as illustrated in FIG. 12D, the platen 40 moves in the direction Y1 of the sub-scanning direction Y, followed by being on standby for an instruction for main printing for desired printing to the print target. In a case where the stored result of detection indicates that the print target for pattern printing has been detected, no printing starts even when an instruction for main printing is given. In a case where the stored result of detection indicates that no print target for pattern printing has been detected, main printing starts when an instruction for main printing is given.

Figure 13:
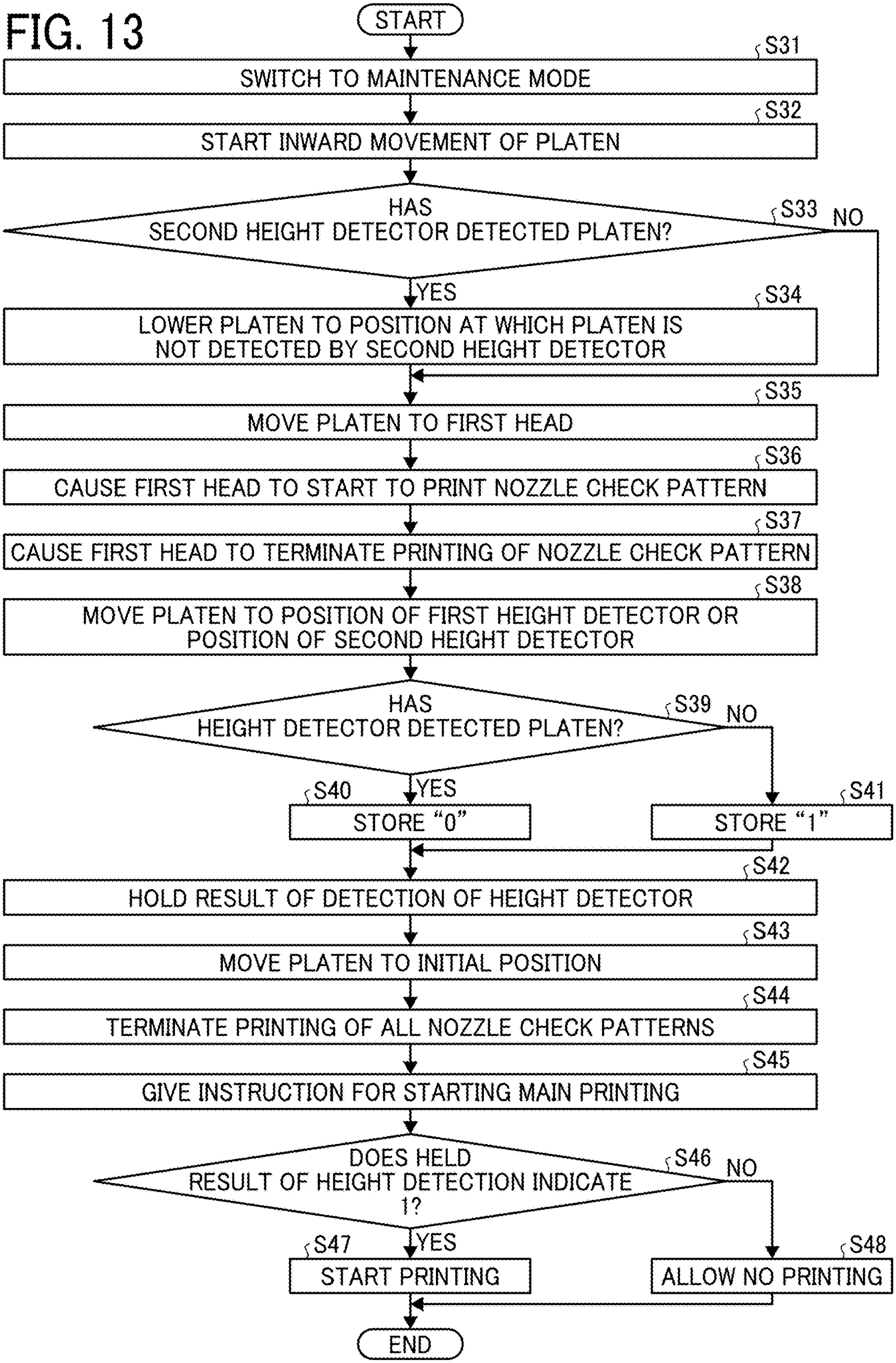
FIG. 13 is a flowchart for describing control according to printing of a nozzle check pattern by a controller in the fourth embodiment.

Next, control according to printing of a nozzle check pattern by a controller in the present embodiment will be described with reference to the flowchart of FIG. 13.

First, a switch is made to a maintenance mode (S31).

Then, inward movement of the platen 40 starts (movement in the direction Y1) (S32).

Then it is determined whether or not the second height detector 80B has detected the platen 40 (S33).

In a case where the second height detector 80B has detected the platen 40, the platen 40 is lowered to a position at which the platen 40 is not detected by the second height detector 80B (S34).

After that, the platen 40 moves to the first head 10A (S35). The first head 10A starts to print a nozzle check pattern (S36). The first head 10A terminates the printing of the nozzle check pattern (S37).

Next, the platen 40 moves to the position of the first height detector 80A or the position of the second height detector 80B (S38).

Then, it is determined whether or not the first height detector 80A or the second height detector 80B has detected the platen 40 (S39).

In a case where the first height detector 80A or the second height detector 80B has detected the platen 40, "0" is stored (S40). In a case where the first height detector 80A or the second height detector 80B has detected no platen 40, "1" is stored (S41).

After that, the result of detection (0 or 1) of the first height detector 80A or the second height detector 80B is held (S42).

Next, the platen 40 moves to the initial position in the direction Y2 (S43). Then, the printing of all the nozzle check patterns is terminated (S44).

After that, an instruction for starting main printing is given (S45). It is determined whether or not the held result of detection of the first height detector 80A or the second height detector 80B is "1" (S46).

In a case where the held result of detection is "1", main printing starts (S47). In a case where the held result of detection is not "1", that is, in a case where the held result of detection is "0", no main printing starts (S48).

Figure 14:
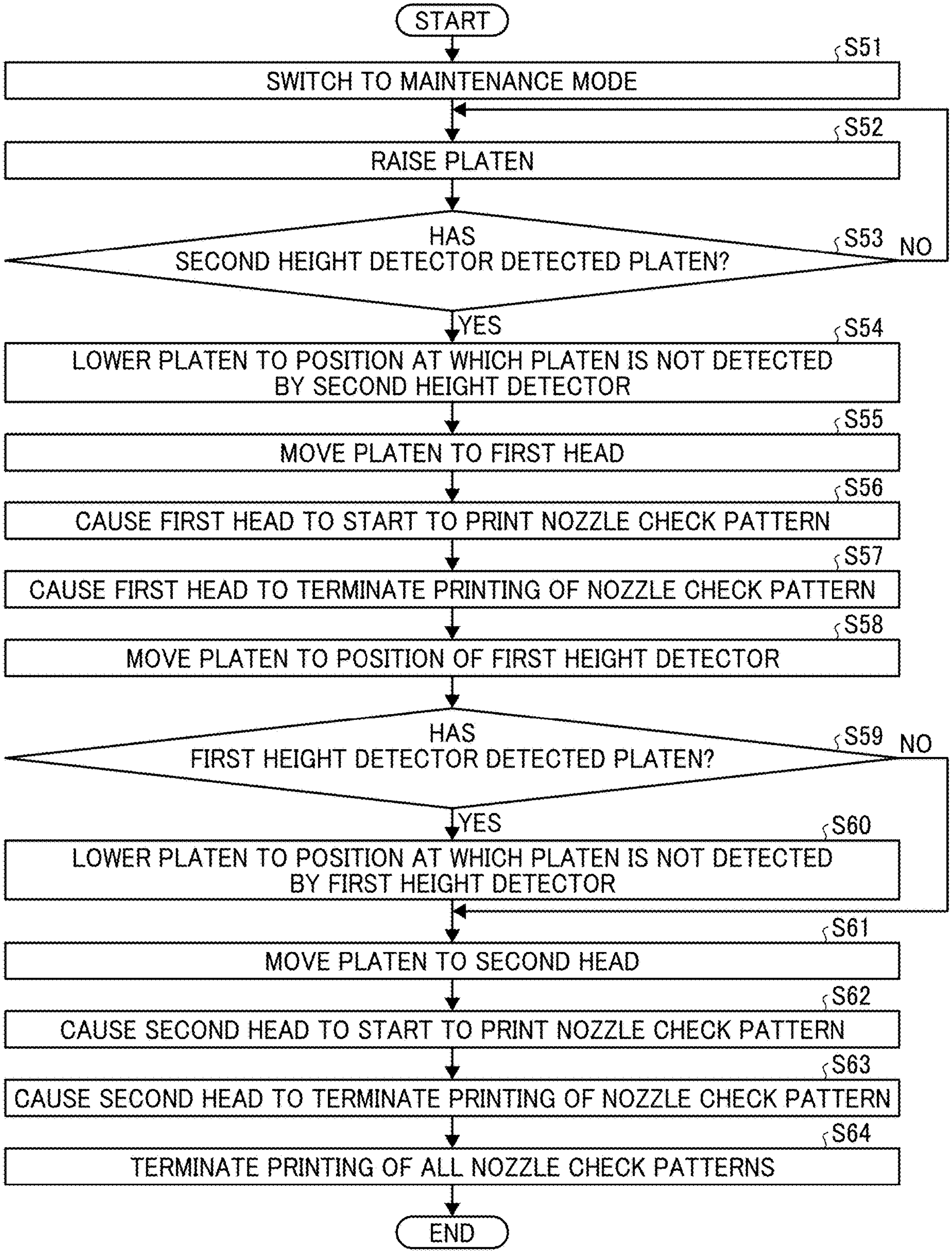
FIG. 14 is a flowchart for describing control according to printing of a nozzle check pattern by a controller in a fifth embodiment of the present embodiment.

Next, a fifth embodiment of the present embodiment will be described with reference to FIG. 14. FIG. 14 is a flowchart for describing control according to printing of a nozzle check pattern by a controller in the fifth embodiment.

First, a switch is made to a maintenance mode (S51).

Then, a platen 40 is raised (S52). Then, it is determined whether or not a second height detector 80B has detected the platen 40 (S53). The processing in steps S52 and S53 is repeated until the second height detector 80B detects the platen 40.

After that, the platen 40 is lowered to a position at which the platen 40 is not detected by the second height detector 80B (S54). The amount of lowering at this time causes a predetermined gap between a print target and the nozzle face of a first head 10A or the nozzle face of a second head 10B.

Next, the platen 40 moves to the first head 10A (S55). The first head 10A starts to print a nozzle check pattern (S56). The first head 10A terminates the printing of the nozzle check pattern (S57).

Next, the platen 40 moves to the position of a first height detector 80A (S58).

Then, it is determined whether or not the first height detector 80A has detected the platen 40 (S59).

In a case where the first height detector 80A has detected the platen 40, the platen 40 is lowered to a position at which the print target on the platen 40 is not detected by the first height detector 80A (S60).

After that, the platen 40 moves to the second head 10B (S61). The second head 10B starts to print a nozzle check pattern (S62). The second head 10B terminates the printing of the nozzle check pattern (S63).

Then, the printing of all the nozzle check patterns is terminated (S64).

As above, in the present embodiment, a holder is controlled to rise to a height at which the holder can be detected by at least one (second height detector) of the multiple height detectors 80 and then the holder is controlled to fall to a position at which the holder is not detected by the at least one.

Thus, gap failure due to excessive lowering of the holder can be prevented between the print target and the nozzle face.

Figure 15:
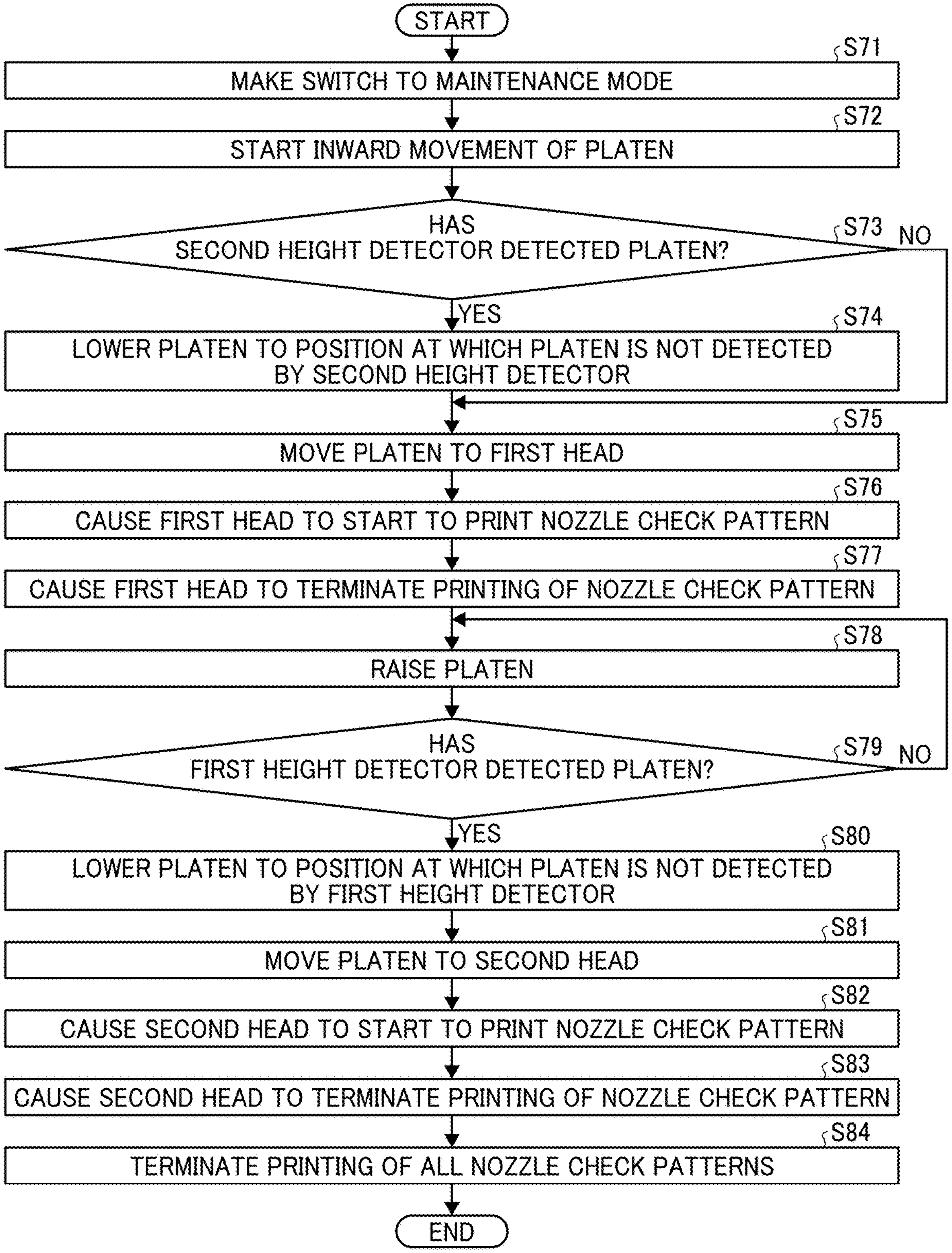
FIG. 15 is a flowchart for describing control according to printing of a nozzle check pattern by a controller in a sixth embodiment of the present embodiment.

Next, a sixth embodiment of the present embodiment will be described with reference to FIG. 15. FIG. 15 is a flowchart for describing control according to printing of a nozzle check pattern by a controller in the sixth embodiment.

First, a switch is made to a maintenance mode (S71).

Then, inward movement of a platen 40 starts (movement in the direction Y1) (S72).

Then, it is determined whether or not a second height detector 80B has detected the platen 40 (S73).

In a case where the second height detector 80B has detected the platen 40, the platen 40 is lowered to a position at which the platen 40 is not detected by the second height detector 80B (S74).

Then, the platen 40 moves to a first head 10A (S75). The first head 10A starts to print a nozzle check pattern (S76). The first head 10A terminates the printing of the nozzle check pattern (S77).

Next, the platen 40 is raised (S78). Then, it is determined whether or not a first height detector 80A has detected the platen 40 (S79). The processing in steps S78 and S79 is repeated until the first height detector 80A detects the platen 40.

After that, the platen 40 is lowered to a position at which the platen 40 is not detected by the first height detector 80A (S80). The amount of lowering at this time causes a predetermined gap between a print target and the nozzle face of the first head 10A or the nozzle face of a second head 10B.

Next, the platen 40 moves to the second head 10B (S81). The second head 10B starts to print a nozzle check pattern (S82). The second head 10B terminates the printing of the nozzle check pattern (S83).

Then, the printing of all the nozzle check patterns is terminated (S84).

As above, in the present embodiment, a holder is controlled to rise to a height at which the holder can be detected by at least one (first height detector) of the multiple height detectors 80 and then the holder (platen 40) is controlled to fall to a position at which the holder is not detected by the at least one.

Thus, gap failure due to excessive lowering of the holder can be prevented between the print target and the nozzle face.

Note that, in the above embodiments, the holder has been described as a platen, but this is not limiting. In the above embodiments, the holder moves to each liquid discharger in the sub-scanning direction. However, with the holder secured, each liquid discharger may move in the sub-scanning direction.

Although the printer in the above-described embodiments prints on the fabric, a print target is not limited to the fabric. Even in a case where printing is performed with the print target, different from any fabric, set to the holder, similarly, the present embodiment can be applied.

The term "liquid discharge apparatus" used herein represents an apparatus including a liquid discharge head or a liquid discharge unit to drive the liquid discharge head to discharge a liquid. The liquid discharge apparatus may be, for example, an apparatus capable of discharging a liquid to a material to which liquid can adhere or an apparatus to discharge liquid toward gas or into liquid.

The "liquid discharge apparatus" may include devices to feed, convey, and eject the material to which liquid can adhere. The "liquid discharge apparatus" can further include a pretreatment apparatus and a post-treatment apparatus.

Aspects of the present embodiment are, for example, as follows:

Aspect 1

A printer includes a liquid discharger that discharges liquid to a print target; a carriage that moves the liquid discharger in a main scanning direction; a holder that holds the print target, the holder moving the print target in a sub-scanning direction orthogonal to the main scanning direction; and multiple height detectors that detects the print target on the holder, in which the liquid discharger and the holder are relatively movable in the sub-scanning direction, and the multiple height detectors is disposed at different positions in the sub-scanning direction.

Aspect 2

In the printer according to 1, the liquid discharger includes multiple liquid dischargers.

Aspect 3

In the printer according to aspect 2, a height detector in the multiple height detectors is disposed between the multiple liquid dischargers in the sub-scanning direction.

Aspect 4

In the printer according to any of 1 to 3, the printer further includes a controller that moves the holder and the liquid discharger relatively movable in a height direction, relatively in the height direction, based on a result of detection of each of the multiple height detectors.

Aspect 5

In the printer according to aspect 4, in operation for printing a pattern for verifying a state of discharge of the liquid discharger, the controller moves the holder and the liquid discharger relatively in the height direction, based on the result of detection of a height detector in the multiple height detectors, in order to move the liquid discharger and the holder relatively to a start position for printing of the pattern in the sub-scanning direction, and moves the liquid discharger and the holder relatively to an initial position after the printing of the pattern, without the result of detection of each of the multiple height detectors.

Aspect 6

In the printer according to aspect 4, in operation for printing a pattern for verifying a state of discharge of the liquid discharger, the controller moves the holder and the liquid discharger relatively in the height direction, based on the result of detection of a height detector in the multiple height detectors, in order to move the liquid discharger and the holder relatively to a start position for printing of the pattern in the sub-scanning direction, and allows no printing in a case where the print target is detected by a height detector in the multiple height detectors during relative movement of the liquid discharger and the holder to the start position for printing of the pattern after the printing of the pattern.

Aspect 7

In the printer according to any of aspects 4 to 6, after raising the holder to a height at which the holder is detected by a height detector in the multiple height detectors, the controller lowers the holder to a position at which the holder is not detected by the height detector.

Aspect 8

In the printer according to any of aspects 1 to 7, the print target includes a fabric.

According to the present embodiment, an improvement can be made in the accuracy of detection of the height of a print target.

Aspect 9

A printer includes: a liquid discharger configured to discharge a liquid onto a print target; a carriage configured to move the liquid discharger in a main scanning direction; a holder configured to hold the print target and relatively move the print target in a sub-scanning direction orthogonal to the main scanning direction to cause the print target to face the liquid discharger; and multiple height detectors at different positions in the sub-scanning direction, the multiple height detectors configured to detect the print target on the holder.

Aspect 10

The printer according to aspect 9, further includes multiple liquid dischargers including the liquid discharger, the multiple liquid dischargers at different positions in the sub-scanning direction.

Aspect 11

In the printer according to aspect 10, at least one height detector among the multiple height detectors is between the multiple liquid dischargers in the sub-scanning direction.

Aspect 12

The printer according to aspect 9, further includes: circuitry configured to relatively move the holder and the liquid discharger in a height direction orthogonal to the main scanning direction and the sub-scanning direction based on a detection of each of the multiple height detectors.

Aspect 13

In the printer according to aspect 9, the multiple height detectors are at the same height.

Aspect 14

In the printer according to aspect 13, the circuitry is further configured to: detect the print target on the holder by one of the multiple height detectors at upstream end in the sub-scanning direction; relatively move the holder and the liquid discharger in the height direction to adjust a height of the holder based on a detection of said one of the multiple height detectors; relatively move the holder and the liquid discharger to a start position to start printing a check pattern in the sub-scanning direction; start printing a check pattern to check a discharge state of the liquid discharger at the start position; and relatively move the holder and the liquid discharger to an initial position without detecting the print target on the holder by each of the multiple height detectors after printing the check pattern.

Aspect 15

In the printer according to aspect 13, the circuitry is further configured to: detect the print target on the holder by one of the multiple height detectors at upstream end in the sub-scanning direction; relatively move the holder and the liquid discharger in the height direction to adjust a height of the holder based on a detection of said one of the multiple height detectors; relatively move the holder and the liquid discharger to a start position to start printing a check pattern in the sub-scanning direction; start printing a check pattern to check a discharge state of the liquid discharger at the start position; and relatively move the holder and the liquid discharger to positions of the multiple height detectors to detect the print target on the holder, start printing an image when none of the multiple height detectors detects the print target; and hold a start of printing the image when at least one of the multiple height detectors detects the print target.

Aspect 16

In the printer according to aspect 13, the circuitry is further configured to: raise the holder to a height at which the holder is detected by at least one of the multiple height detectors; and lower the holder to a position at which the holder is not detectable by said at least one of the multiple height detectors after the holder has raised.

Aspect 17

In the printer according to aspect 9, the print target includes a fabric.

Each of the functions of the described embodiments such as the print controller 801 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A printer comprising:

a liquid discharger configured to discharge a liquid onto a print target;

a carriage configured to move the liquid discharger in a main scanning direction;

a holder configured to hold the print target and relatively move the print target in a sub-scanning direction orthogonal to the main scanning direction to cause the print target to face the liquid discharger;

multiple height detectors at different positions in the sub-scanning direction, the multiple height detectors configured to detect the print target on the holder; and circuitry configured to relatively move the holder and the liquid discharger in a height direction orthogonal to the main scanning direction and the sub-scanning direction based on a detection of each of the multiple height detectors, wherein the circuitry is further configured to:

raise the holder to a height at which the holder is detected by at least one of the multiple height detectors; and lower the holder to a position at which the holder is not detectable by said at least one of the multiple height detectors after the holder has raised.

2. The printer according to claim 1, further comprising multiple liquid dischargers including the liquid discharger, the multiple liquid dischargers at different positions in the sub-scanning direction.

3. The printer according to claim 2, wherein at least one height detector among the multiple height detectors is between the multiple liquid dischargers in the sub-scanning direction.

4. The printer according to claim 1, wherein the multiple height detectors are at the same height.

5. The printer according to claim 1, wherein the circuitry is further configured to:

detect the print target on the holder by one of the multiple height detectors at upstream end in the sub-scanning direction;

relatively move the holder and the liquid discharger in the height direction to adjust a height of the holder based on a detection of said one of the multiple height detectors;

relatively move the holder and the liquid discharger to a start position to start printing a check pattern in the sub-scanning direction;

start printing a check pattern to check a discharge state of the liquid discharger at the start position; and relatively move the holder and the liquid discharger to an initial position without detecting the print target on the holder by each of the multiple height detectors after printing the check pattern.

6. The printer according to claim 1, wherein the print target includes a fabric.

7. A printer comprising:

a liquid discharger configured to discharge a liquid onto a print target;

a carriage configured to move the liquid discharger in a main scanning direction;

a holder configured to hold the print target and relatively move the print target in a sub-scanning direction orthogonal to the main scanning direction to cause the print target to face the liquid discharger; and multiple height detectors at different positions in the sub-scanning direction, the multiple height detectors configured to detect the print target on the holder;

wherein the multiple height detectors are at the same height.

8. A printer comprising:

a liquid discharger configured to discharge a liquid onto a print target;

a carriage configured to move the liquid discharger in a main scanning direction;

a holder configured to hold the print target and relatively move the print target in a sub-scanning direction orthogonal to the main scanning direction to cause the print target to face the liquid discharger;

multiple height detectors at different positions in the sub-scanning direction, the multiple height detectors configured to detect the print target on the holder; and circuitry configured to relatively move the holder and the liquid discharger in a height direction orthogonal to the main scanning direction and the sub-scanning direction based on a detection of each of the multiple height detectors, wherein the circuitry is further configured to:

detect the print target on the holder by one of the multiple height detectors at upstream end in the sub-scanning direction;

relatively move the holder and the liquid discharger in the height direction to adjust a height of the holder based on a detection of said one of the multiple height detectors;

relatively move the holder and the liquid discharger to a start position to start printing a check pattern in the sub-scanning direction;

start printing a check pattern to check a discharge state of the liquid discharger at the start position; and relatively move the holder and the liquid discharger to positions of the multiple height detectors to detect the print target on the holder, start printing an image when none of the multiple height detectors detects the print target; and hold a start of printing the image when at least one of the multiple height detectors detects the print target.

* * * * *